United States Patent [19]
Zaguroli, Jr.

[11] Patent Number: 5,156,463
[45] Date of Patent: Oct. 20, 1992

[54] ROLLER BEARING ASSEMBLY AND ARRANGEMENT FOR POWER TOOL SUPPORT

[76] Inventor: James Zaguroli, Jr., 3080 Loon Lake Shores, Drayton Plains, Mich. 48020

[21] Appl. No.: 702,277

[22] Filed: May 17, 1991

[51] Int. Cl.⁵ .......................... F16C 29/04; B66C 19/00
[52] U.S. Cl. ........................................ 384/53; 212/135; 384/58
[58] Field of Search ................... 384/7, 9, 35, 46, 48, 384/50, 52, 53, 58, 59; 212/135

[56] References Cited

U.S. PATENT DOCUMENTS

| | | | |
|---|---|---|---|
| 519,514 | 5/1894 | Tragethon | 384/58 |
| 2,185,304 | 1/1940 | Knapp | 384/53 |
| 2,212,696 | 8/1940 | Nash | 212/135 X |
| 2,316,727 | 4/1943 | Thompson | 384/46 |
| 2,638,387 | 5/1953 | Bech | 384/58 X |
| 3,887,155 | 6/1975 | Bertalot | 384/53 X |
| 4,812,088 | 3/1989 | Hake | 384/58 X |
| 5,004,203 | 4/1991 | Fabius | 384/53 |

*Primary Examiner*—Thomas R. Hannon
*Attorney, Agent, or Firm*—John R. Benefiel

[57] ABSTRACT

A roller assembly and arrangement for a torque reaction absorbing power tool support, in which sets of pairs of parallel opposing rollers are mounted to a bracket to define a space receiving a tool support shaft for guided in and out movement of the shaft. The shaft may be square shaped to absorb torque by torsion of the shaft, or round in shape to allow swinging of the shaft to position a supported tool.

12 Claims, 3 Drawing Sheets

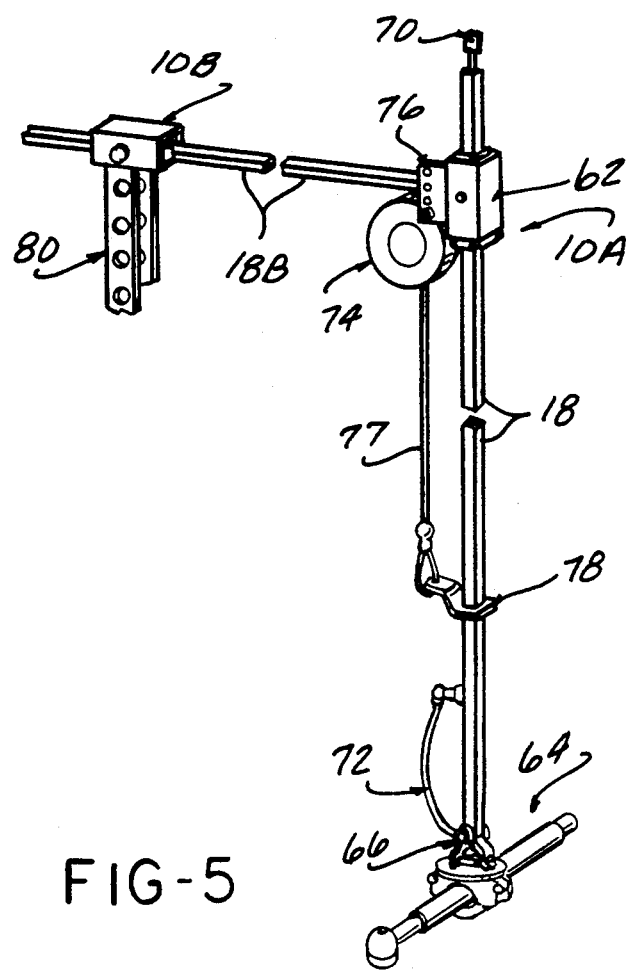
FIG-5
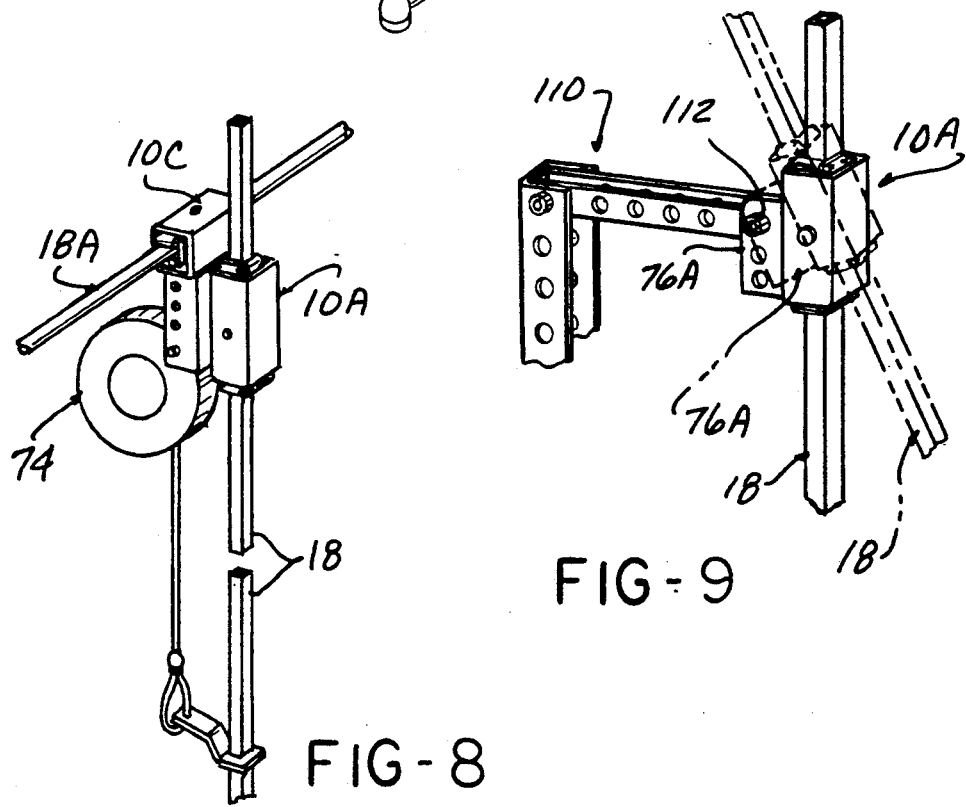
FIG-8
FIG-9

1

ROLLER BEARING ASSEMBLY AND ARRANGEMENT FOR POWER TOOL SUPPORT

This invention concerns arrangements for supporting power tools used in production such as pneumatic wrenches and screwdrivers for driving fasteners in such a way as to allow the tool to be properly positioned by the operator, and so as to absorb the torque reactions generated.

Such arrangements have been devised in the past, and have often also provided for counterbalancing the weight of the tool to ease the physical effort required and to minimize physical wear and tear of operators body.

One arrangement has included the use of telescoping square shafts vertically supported to which the tool is mounted. The square shafts are counterbalanced, and extend vertically to allow the tool to be raised and lowered in order to be properly positioned to engage the fastener.

This arrangement is shown in U.S. Pat. No. 2,212,696, issued on Aug. 27, 1940 for "Tool Suspension".

While providing an effective torque reaction absorbing tool support, the telescoping square shafts are costly, and are prone to becoming stuck, and generate substantial friction in use.

Such arrangements are typically useful in a variety of situations in which workpieces of varying configurations are presented in numerous different orientations such that tool positioning motions are required. For example, linear travel of the tool along an overhead track might be required in one situation while only a swinging support is necessary in another. Also, if the tool is turned out of the horizontal plane, the torque reaction exerts a shaft bending force and need not be absorbed by torsion applied to the support shaft, such that a round shaft could be used.

In the interest of minimizing fabricating costs, simple component elements of such arrangements, usable in a wide variety of situations would be advantageous.

SUMMARY OF THE INVENTION

According to the present invention, a crossed roller assembly is provided which can be used to guide a square or round shaft, can be fabricated cheaply, and utilized in a variety of tool support arrangements.

The crossed roller assembly includes aligned spaced sets of pairs of opposing rollers, respective roller pairs in each set rotated 90 degrees from each other to create location of a shaft received therebetween in two orthogonal directions. Each set of roller pairs is spaced longitudinally from the other and aligned therewith so as to enable guiding of a shaft while maintaining the alignment of the shaft in a fixed direction defined by the mounting of the roller assembly.

Either a round or square shaft may be so guided, with a square shaft held against rotation for installations that require that torque reaction be taken up as torsion of the guided shaft.

The roller assembly may advantageously be configured to include a main attachment bracket having laterally spaced parallel end walls, each formed with a clearance opening allowing the shaft to pass through. A first roller pair of each set is attached on the outside of a respective wall, spaced apart to be positioned on either side of the shaft receiving opening.

A second roller pair is mounted to the inside of each main bracket end wall also located to be positioned on either side of the shaft receiving opening.

The rollers in the pairs may each be mounted to a U-shaped bracket, fastened to the outside and inside of the adjacent main bracket end wall.

The main bracket provides an attachment structure for simple attachment of the roller assemblage to support struts, pivot brackets and other roller assemblages.

The arrangement can include an overhead mounting of a roller assembly for guidance of a support shaft along a vertical axis, with attachment of a counterweight cable to the shaft, so that the shaft can be secured guided along the direction determined by the mounting of the rollers assembly main bracket. Variations include a pivotal mounting of the main bracket to a fixed structure to allowing swinging movement of the shaft. Alternatively the roller assembly can be mounted to a second horizontal shaft extending at right angles to the tool support shaft received therein. The horizontal shaft in turn is received in a second roller assembly attached to a support shaft, so that the horizontal movement of the tool support shaft is enabled.

A second roller assembly fixed directly to extend at right angles to the roller assembly guiding the tool support shaft. An overhead fixed round or square shaft received in the second roller assembly provides a low cost track for linear guided movement of the tool support shaft. If a round shaft is employed too the tool support shaft may be swung in and out for additional tool positioning flexibility. The second roller assembly could also be employed as a low cost trolley for movement of the tool support shaft along an overhead fixed track.

A hollow tool support shaft can be employed as a conduit to direct air flow to a point closely adjacent to the power tool to minimize the presence of air hoses in the vicinity of the operation.

An adjustable clamp is preferably employed to attach the tool to the lower end of the tool support shaft, such a single clamp size can be employed for a variety of power tool shapes and sizes, a U-joint included where required for the particular application.

DESCRIPTION OF THE DRAWINGS

FIG. 5 is a perspective view of a tool support arrangement using the roller assembly shown in FIG. 1-3.

FIG. 8 is a perspective view of another tool support arrangement utilizing the roller assembly shown in FIGS. 1-3.

FIG. 9 is a fragmentary view of another embodiment of a tool support arrangement according to the invention.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
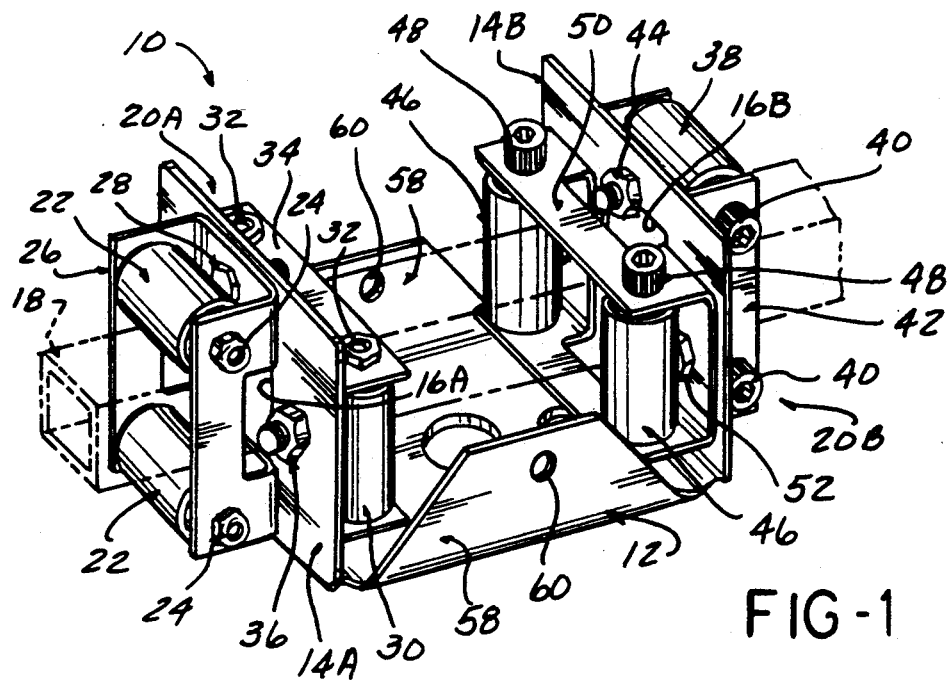
FIG. 1 is a perspective view of a roller assembly according to the present invention, with a square shaft installed therein.
Figure 2:
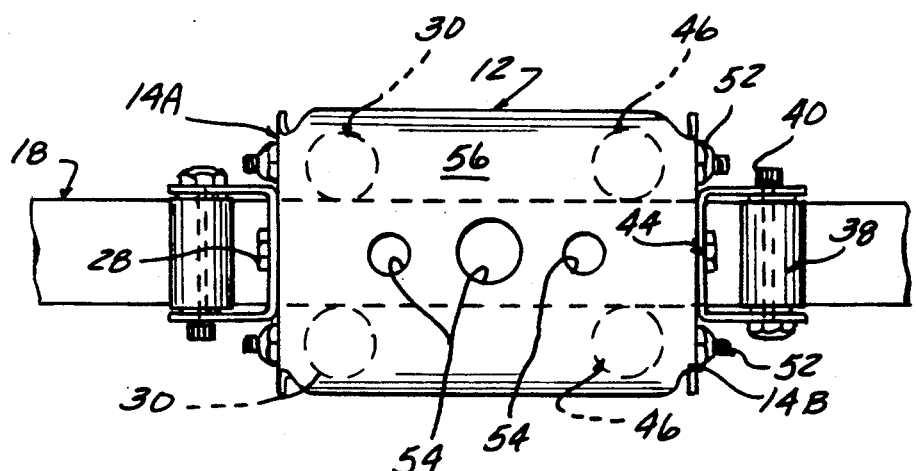
FIG. 2 is a plan view of the roller assembly shown in FIG. 1.
Figure 3:
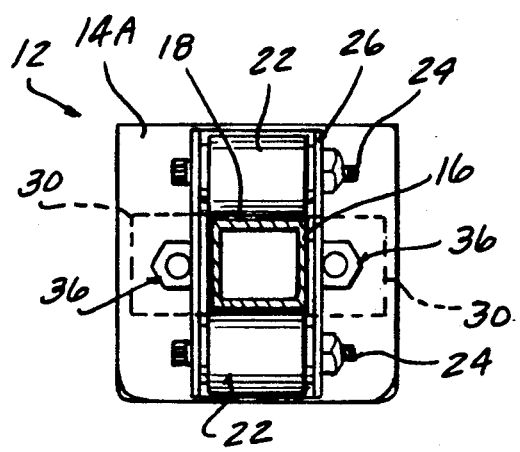
FIG. 3 is an end view of the roller assembly shown in FIGS. 1 and 2, with a cross section of the square shaft.

As seen in FIG. 1, the roller assembly 10 according to the invention includes a main bracket 12, which may be constructed of formed steel. The main bracket 12 has a pair of spaced apart parallel end walls 14A, 14B. Each end wall 14A, 14B has a central clearance opening 16A, 16B sized to allow passage therethrough of a shaft 18 to be guided by the roller assembly 10.

Mounted to each end wall 14A, 14B are respective sets 20A, 20B of two pairs of parallel rollers. The first set 20A of pairs of parallel rollers includes a first pair of parallel rollers 22 which are mounted spaced apart on the outside of side wall 14A, extending in a first direction. The spacing therebetween is just sufficient to allow the shaft 18 to be received therebetween and allow free movement therebetween by rotation of the rollers 22. The rollers 22 may be mounted for low friction rotation by suitable ball or roller bearings supported on bolts 24 extending across the sides of a U-bracket 26. The bracket 26 is secured by means of nut and bolt assemblies 28 to the outside of the side wall 14A. A suitable clearance cut out is provided in U-bracket 26 to enable passage of shaft 18.

A second pair of parallel rollers 30 are mounted spaced apart to the inside of the first endwall 14A, extending in a direction in a parallel plane but orthogonal to the rollers 22 of the first pair.

The space therebetween is likewise set to just allow the shaft 18 to be received therebetween with rotation of rollers 30 allowing free in and out linear movement of the shaft 18. Suitable bearings mounted on bolts 32 can provide frictionless support for the rollers 30 on the sides of a U-bracket 34. The U-bracket 34 is secured to the inside of sidewall 14A by nut and bolt assemblies 36.

The second set 20B of pairs of rollers includes a first pair of rollers 38 mounted parallel and spaced apart, on the outside of sidewall 14B, extending in the same direction as rollers 22 of the first set. The spacing of rollers 30 is set to be just sufficient to receive the shaft 18 and allow free in and out linear movement thereof. Suitable bearings such as ball or roller bearings may be provided supported on bolts 40 extending across the sides of a U-bracket 42. The U-bracket 42 is attached to endwall 14B by nut and bolt assemblies 44, and has a suitable opening to accommodate shaft 18.

Set 20B also includes a second pair of rollers 46 mounted parallel and spaced apart on the inside of sidewall 14B extending in a direction in a parallel plane but orthogonal to the first pair of rollers 38. The spacing of rollers 46 is just sufficient to allow the shaft 18 to be received therebetween for free in-and-out linear movement. Suitable bearings support bolts 48 extending between the sides of a U-bracket 50 mounted to the inside of sidewall 14B by nut and bolt assemblies 52.

The spaced and aligned pairs of rollers define spaces receiving the shaft 18 to allow effective control over the alignment of the shaft 18.

The main bracket 12 is formed with mounting holes 54 in the floor section 56 for various applications as will be described.

Upturned flanges 58 are provided, having tapped holes 60 so as to allow a U-shaped cover 62 (FIG. 5) to be installed to enclose the interior of the roller assembly 10.

Figure 4:
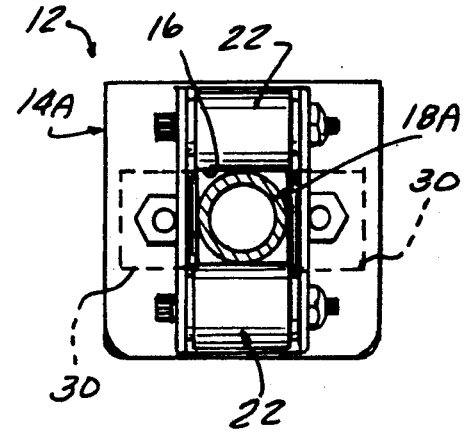
FIG. 4 is an end view of the roller assembly shown in FIGS. 1 and 2 with a cross section of a round shaft.
Figure 6:
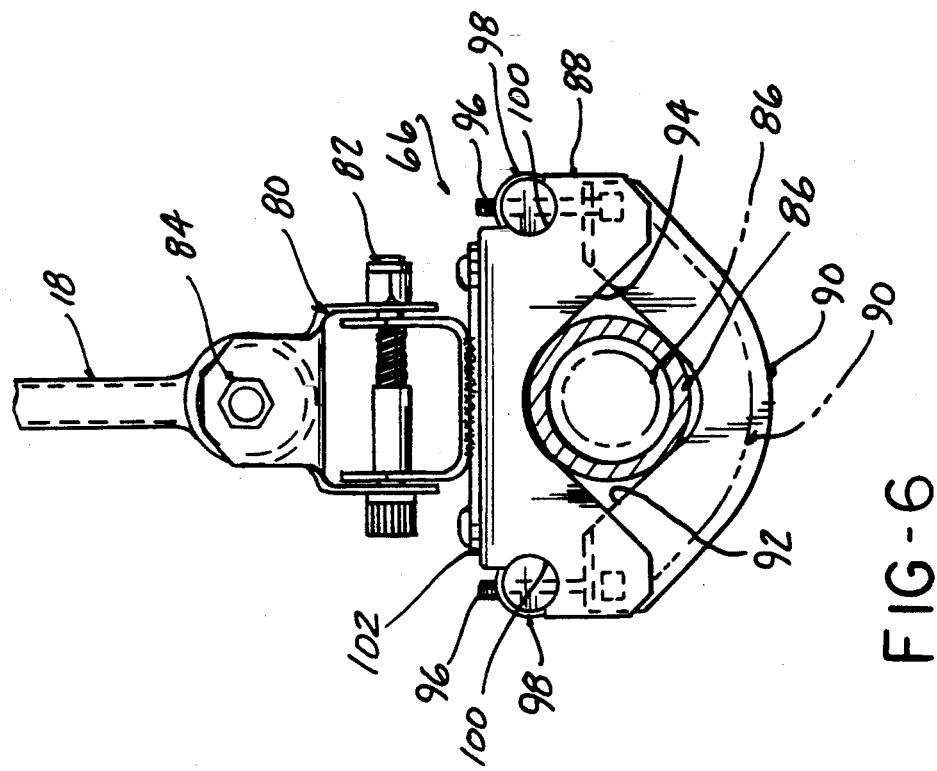
FIG. 6 is an enlarged front view of an adjustable tool clamp attached to the bottom of the tool support shaft.
Figure 7:
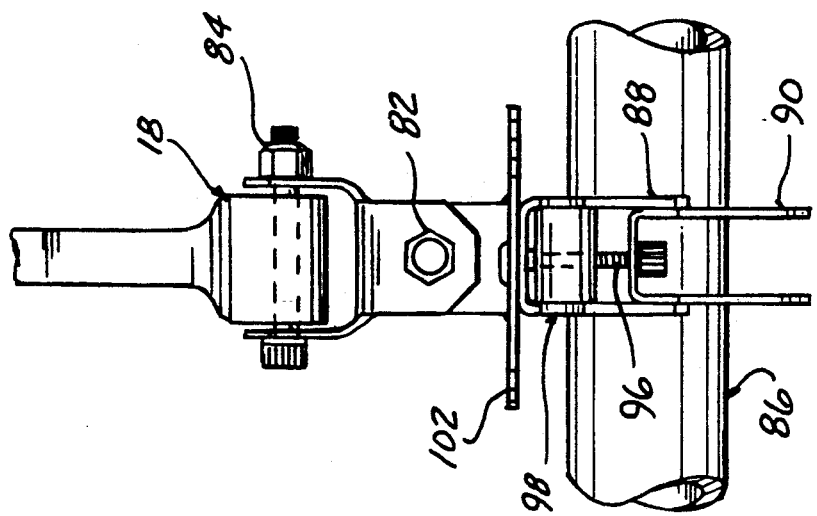
FIG. 7 is a side view of the adjustable clamp shown in FIG. 6.

The roller assembly 10 accommodates a round shaft 18A as well, sized to have its outside diameter tangent to the sides of the rollers 22, 30, 38, 46, as shown in FIG. 4. In this instance, the roller assembly 10 may itself rotate on the round shaft 18A, where absorption of a torque reaction by torsion applied to the square shaft 18 is not required.

FIG. 5 shows a tool support arrangement utilizing the roller assembly 10. The power tool 64 is held to the lower end of a square shaft 18 held for vertical movement in a roller assembly 10A. A clamp 66 secured to shaft 18 allows the tool 64 to be securely held.

The power tool 64 may be pneumatically driven, and the air supply may be via the interior of the shaft 18, a hose and fitting connection 70 to a source of compressed air allowing pressurization of the interior. A short hose 72 can then supply the power tool 64.

A spring counterbalance 74 is mounted to a bracket 76 to the floor section of roller assembly 10A, having a cable 77 attached via a tab 78 secured to the lower section of shaft 18, so as to exert a constant counterforce for the weight of the shaft 18 and tool 64 in the manner well known in the art.

Bracket 76 also rigidly mounts a second square shaft 18B to extend at right angles or horizontally to the first shaft 18. The second shaft 18B is received in a second roller assembly 10B, mounted atop fixed support structure 80. Second shaft 18B can move freely in bearing roller assembly 10B to allow the tool 64 to be positioned in and out as well as up and down.

The clamp 66 may be mounted on a clevis bracket 88 allowing pivoting on a bolt 82 about a first axis, and also about a bolt 84 about a second axis to form a universal connection.

The clamp 66 is preferably adjustable to fit different size tool handle 86. Adjustment is provided by a pair of opposing Vee pieces 88, 90, each formed in a U-shape outer Vee piece 90 nests within inner Vee piece 88, with opposing Vee shapes creating a smaller or larger clamping opening as Vee pieces are adjusted toward or away from each other.

A pair of adjusting screws 96 pass through the bridging section of the outer Vee piece 90 and are each threaded through a hole in a respective anchor pin 98 each have reduced diameter ends nested in radiused cutouts 100 in the wing sections of inner Vee piece 88.

The adjusting screws 96 may be advanced to clamp the Vee pieces onto the tool handle 86 with a considerable range of adjustment to accommodate a variety of tool handle sizes.

The inner Vee piece 88 has a clevis bracket 102 attached with screws to the bridging section thereof, providing the mount for the pivot bolts 82, 84. This allows universal motion is required for the particular application.

FIG. 8 shows another arrangement in which a round shaft 18A is mounted overhead to provide a track. A roller assembly 10C is fixed to the roller assembly 10A by means of bracket 76 also mounting the counterbalance 74.

Roller assembly 10C extends at right angles so as to accept the horizontally extending round shaft 18A. This arrangement provides a low cost trolley support, while at the same time enabling a swinging of the shaft 18 to and fro out of the vertical, as needed for the particular application.

FIG. 9 shows the roller assembly 10 attached to a bracket 76A supported on fixed structure 110 by a pivot connection 112. This allows the shaft 18 to be swung in and out as shown. The bracket 76A may also be pivoted to the roller assembly 10 so as to allow back and forth swinging of the shaft 18.

I claim:

1. A roller assembly for providing guided linear movement of a shaft, said roller assembly comprising:
    a main bracket having a pair of spaced apart parallel end walls;
    a first set of pairs of parallel opposing rollers, said first set comprising a first pair of rollers mounted to one of said endwalls spaced apart and extending in a first direction in a plane parallel to the plane of said endwall, said first set further including a second pair of parallel rollers mounted to said end wall spaced apart and extending in a second direction, said second pair of rollers together with said first pair defining a central space configured to receive said shaft to cause rolling of said rollers in each pair by in and out linear movement of said shaft;
    a second set of pairs of rollers mounted to the other of said endwalls, said second set including a first pair of rollers mounted spaced apart on said other end wall and extending in said first direction and a second pair of rollers mounted spaced apart on said other endwall and extending in said second direction, said first and second pairs of rollers also defining a central space configured to receive said shaft so as to cause rolling of said rollers by in and out linear movement therein of said shaft, said central space defined by respective pairs of rollers in each set being aligned with each other to allow said shaft to pass through both sets.

2. The roller assembly according to claim 2 wherein said pairs of rollers in each set are mounted to the inside and outside of said endwalls respectively, and said endwalls are formed with openings accommodating said shaft.

3. The roller assembly according to claim 2 further including U-brackets mounting each pair of rollers in each set, said U-brackets attached to the inside and outside of each endwall.

4. The roller assembly according to claim 3 wherein each of said main bracket and U-brackets are of formed steel.

5. A power tool support arrangement for supporting a power tool during use, said arrangement comprising:
    a support shaft;
    clamping means for attaching said tool to said shaft at one end thereof;
    a roller assembly comprising a main bracket having a pair of spaced apart parallel end walls;
    a first set of pairs of parallel opposing rollers, said first set comprising a first pair of rollers mounted to one of said endwalls spaced apart and extending in a first direction in a plane parallel to the plane of said endwall, said first set further including a second pair of parallel rollers mounted to said end wall spaced apart and extending in a second direction, said second pair of rollers together with said first pair of rollers defining a central space configured to receive said shaft to cause rolling of said rollers in each pair by in and out linear movement of said shaft;
    a second set of pairs of rollers mounted to the other of said endwalls, said second set including a first pair of rollers mounted spaced apart on said other endwall and extending in said first direction and a second pair of rollers mounted spaced apart on said other endwall and extending in said second direction, said first and second pairs of rollers also defining a central space configured to receive said shaft so as to cause rolling of said rollers by in and out linear movement therein of said shaft, said central space defined by respective pairs of rollers in each set being aligned with each other to allow said shaft to pass through both sets;
    means mounting said main bracket so as to support said roller assembly so as to orient said roller assembly to guide shaft shaft in a generally vertical direction; and
    counterbalance means for supporting the weight of said shaft.

6. The power tool support according to claim 5 wherein said means mounting said main bracket comprises a second horizontally extending shaft attached at one end to said main bracket, and a second roller assembly configured as said first roller assembly, and means mounting said second roller assembly so as to receive said horizontal second shaft and allow in and out movement therein.

7. The power tool support according to claim 5 further including a second roller assembly configured as said first roller assembly and attached to said first roller assembly to extend in a horizontal direction, and horizontal shaft received in said second roller assembly for linear in and out movement.

8. The power tool support according to claim 7 wherein said horizontal shaft is round in cross sectional shape to allow swinging of said tool supporting shaft thereon.

9. The power tool support according to claim 5 wherein said shaft is rectangular in cross sectional shape.

10. The power tool support according to claim 5 wherein said power tool is pneumatically powered, and wherein said shaft is hollow and pressurized with air, and including a short hose connected to said shaft and to said tool to supply compressed air to said tool from the interior of said shaft.

11. The power tool support according to claim 5 wherein said roller assembly is mounted to be pivotal to allow swinging of said shaft.

12. The power tool support according to claim 5 wherein said clamping means includes a pair of Vee pieces nested together and having Vee shapes facing each other adapted to grip a tool handle, and means for adjustably positioning said Vee pieces further or closer together to clamp tool handles of different sizes.

* * * * *